United States Patent [19]

Throckmorton et al.

[11] 4,102,817

[45] Jul. 25, 1978

[54] CATALYST COMPOSITION FOR THE PREPARATION OF BUTADIENE

[75] Inventors: Morford C. Throckmorton; William M. Saltman, both of Akron, Ohio

[73] Assignee: The Goodyear Tire & Rubber Company, Akron, Ohio

[21] Appl. No.: 513,629

[22] Filed: Oct. 10, 1974

Related U.S. Application Data

[60] Division of Ser. No. 380,176, Jul. 18, 1973, Pat. No. 3,856,764, which is a continuation-in-part of Ser. No. 202,024, Nov. 24, 1971, abandoned.

[51] Int. Cl.$^2$ .............................................. C08F 4/70
[52] U.S. Cl. ............................... 252/429 B; 252/428; 252/431 R; 252/431 C; 252/431 N; 526/137
[58] Field of Search ........... 252/429 B, 431 R, 431 C, 252/431 N, 428

[56] References Cited

U.S. PATENT DOCUMENTS

| 3,591,658 | 7/1971 | Onishi et al. ................. 252/429 B X |
| 3,624,000 | 11/1971 | Throckmorton ................ 252/429 B |
| 3,844,974 | 10/1974 | Throckmorton ................ 252/429 B |

*Primary Examiner*—Patrick P. Garvin
*Attorney, Agent, or Firm*—J. Y. Clowney

[57] ABSTRACT

A process for producing cis-1,4 polybutadiene by contacting butadiene with a catalyst consisting of (1) at least one organoaluminum compound, (2) at least one nickel compound selected from the class consisting of nickel salts of carboxylic acids, organic complex compounds of nickel, nickel tetracarbonyl, and (3) at least one hydrogen fluoride complex prepared by complexing hydrogen fluoride with a member of the class consisting of ketones, esters, ethers, alcohols, nitriles and water.

1 Claim, No Drawings

CATALYST COMPOSITION FOR THE PREPARATION OF BUTADIENE

This is a division of application Ser. No. 380,176 filed July 18, 1973, now U.S. Pat. No. 3,856,764 issued Dec. 24, 1974 which was a continuation in part of application Ser. No. 202,024, filed Nov. 24, 1971, now abandoned.

This invention is directed to a method of polymerization of butadiene and/or butadiene in mixture with other diolefins to form polymers with a high, i.e. 90 percent or more, content of cis-1,4 addition. It is also directed to catalyst systems useful for this purpose. Such polymers have been found to possess properties which make them useful as synthetic rubbers.

It is an object of this invention to provide a method whereby butadiene can be polymerized to a high, i.e. 90 to 98 percent, content of cis-1,4-polybutadiene. Another object is to provide a catalyst system by which these polymerizations may be accomplished. Another object is to form copolymers of isoprene and butadiene in which the polybutadiene segment has a high content of cis-1,4 structure. Other objects will become apparent as the description proceeds.

According to the invention, butadiene or butadiene in mixture with other diolefins is polymerized, by contacting under solution polymerization conditions, with a catalyst consisting essentially of (1) at least one organoaluminum compound, (2) at least one nickel compound selected from the class consisting of nickel salts of carboxylic acids, organic complex compounds of nickel, nickel tetracarbonyl and (3) at least one hydrogen fluoride complex prepared by complexing hydrogen fluoride with a member of the class consisting of ketones, ethers, esters, alcohols, nitriles and water.

By the term "organoaluminum compound" is meant any organoaluminum compound responding to the formula:

in which $R_1$ is selected from the group consisting of alkyl (including cycloalkyl), aryl, alkaryl, arylalkyl, alkoxy, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, di-n-butyl aluminum fluoride, diisobutyl aluminum fluoride, dihexyl aluminum fluoride, dioctyl aluminum fluoride, and diphenyl aluminum fluoride. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Aslo included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also included are diethylaluminum ethoxide, diisobutylaluminum ethoxide and dipropylaluminum methoxide.

The component of the catalyst of this invention which contains nickel may be any organonickel compound. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis(α-furyl dioxime) nickel, nickel palmitate, nickel stearate, nickel acetylacetonate, nickel salicaldehyde, bis(salicylaldehyde) ethylene diimine nickel, bis(cyclopentadiene) nickel, cyclopentadienylnickel nitrosyl and nickel tetracarbonyl. The preferred component containing nickel is a nickel salt of a carboxylic acid or an organic complex compound of nickel.

The component of the catalyst of this invention which contains the hydrogen fluoride associated complexes should be compounds which readily associate themselves with hydrogen fluoride.

The compounds which associate with the hydrogen fluoride to form this component of the catalyst, are the type that are capable of associating with the hydrogen fluoride because of its strong hydrogen bonding character. Such compounds of association contain an atom or radical which is capable of lending electrons to or sharing electrons with hydrogen fluoride. Compounds capable of associating are ethers, alcohols, ketones, esters, nitriles and water.

The ketone subclass can be defined by the formula

where R' and R represent alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the ketone-hydrogen fluoride complexes of this invention are dimethyl ketone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones to form the ketone-hydrogen fluoride of this invention are the dialkyl ketones of which acetone is most preferred.

The nitrile subclass can be represented by the formula RCN where R represents an alkyl, cycloalkyl, aryl, alkaryl and arylalkyl and contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex prepared from the nitriles is hydrogen fluoride benzonitrile complex.

The alcohol subclass can be defined by the formula ROH where R represents alkyl, cycloalkyl, aryl, alkaryl, and arylalkyl radicals containing from about 1 to about 30 carbon atoms.

These alcohols represent a class of compounds which have a carbon atom attached by a single bond to oxygen which is in turn attached to a hydrogen by a single bond. Representative but not exhaustive of the alcohols useful in the preparation of the hydrogen fluoride complexes are methanol, ethanol, n-propanol, i-propanol, phenol, cyclohexanol, butanol, hexanol and pentanol. The preferred hydrogen fluoride-alcohol complex is hydrogen fluoride phenolate complex.

The ether subclass can be defined by the formula R'OR where R and R' represent alkyl, cycloalkyl, aryl, alkaryl, and arylalkyl radicals containing from about 1 to about 30 carbon atoms; R and R' may be the same or dissimilar. The R's may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes of this invention are dimethyl, diethyl, dibutyl, diamyl, diisopropyl ethers, or tetrahydrofuran, anisole, diphenyl ether, ethyl methyl ether, dibenzyl ether and the like. The preferred hydrogen fluoride-ether complexes formed from the ethers are hydrogen fluoride diethyl etherate and hydrogen fluoride dibutyl etherate complexes.

The ester subclass can be defined by the formula:

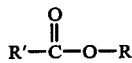

wherein R and R' are represented by alkyl, cycloalkyl, aryl, alkaryl and arylalkyl radicals containing from 1 to about 20 carbon atoms. The esters contain a carbon atom attached by a double bond to an oxygen atom as indicated. Representative but not exhaustive of the esters are ethyl benzoate, amyl benzoate, phenyl acetate, phenyl benzoate and other esters conforming to the formula above. The preferred hydrogen fluoride-ester complex is hydrogen fluoride ethyl benzoate complex.

Hydrogen fluoride is a limpid liquid which fumes strongly in air, is very poisonous, forms ulcerated sores if it comes in contact with the skin, and is very dangerous to handle or manipulate. By complexing the hydrogen fluoride with the complexing agents heretofore mentioned, some of the advantages of this invention are a safer, easier and more accurate way of handling the hydrogen fluoride component of the catalyst system. Hydrogen fluoride complexes usually have a lower vapor pressure and do not fume as badly as does hydrogen fluoride. Hydrogen fluoride boils at 19.7° C. whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and, thus, can be handled and charged to the system as a liquid solution. The solvent which can be employed may be an alkyl, alkaryl, arylalkyl or an aryl hydrocarbon. Benzene, for example, is a convenient solvent system.

The complexes of this invention are usually prepared by simply dissolving appropriate amounts of the complexing agent for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, should be done in the absence of water vapor. Another possible method would be to dissolve either the hydrogen fluoride or the complexing agent in a suitable solvent and adding the other component. Still another method of mixing would be to dissolve the complexing agent in a solvent and simply bubble gaseous hydrogen fluoride through the system until the complexing agent is reacted with hydrogen fluoride. The concentrations may be determined by weight gain or chemical titration. The amount of complexing agent cannot be specifically set down. The amount of complexing agent may be a range depending on the conditions of the reaction system, the hydrogen bonding strength of the complexing agent the size of the complexing agent, or it may be an equilibrium between the hydrogen fluoride complex and the hydrogen fluoride plus the complexing agent.

The three catalyst components of this invention can be charged separately to the reactor containing the butadiene and/or mixtures thereof with other diolefins and the solvent system therefor, either stepwise or simultaneously. It has been discovered that when the three catalyst components of this invention are mixed together outside of the reactor and then added to the reactor, the catalyst system is not very active. Thus, the catalyst should not be preformed by mixing the three catalyst components together prior to contacting butadiene.

However, an improved preformed catalyst system can be prepared by mixing the three catalyst components together while in the presence of a small amount of a conjugated diolefin, for example, butadiene or isoprene. It appears that by mixing the three catalyst components together in the presence of the small amount of a diolefin seems to stabilize the catalyst system and allows the formation of a very active preformed catalyst.

The diolefin apparently reacts with the catalyst components to form a catalyst complex which is more stable and active, particularly, when the polymerization system contains more impurities than the "in situ" catalyst where the individual catalyst components are added to the reactor containing a very large amount of monomer and then allowed to react with each other. The improved preformed catalyst may be prepared by dissolving a small amount of diolefin in a hydrocarbon solvent such as benzene or hexane and then adding the organoaluminum component, the Ni component and then the HF-complex component to the solvent.

The particular order of addition in preforming the catalysts may be varied somewhat, but it is advantageous to have (1) the diolefin present before the addition of both the organoaluminum and Ni components and (2) the Ni component present before the addition of both the organoaluminum and HF-complex catalyst components. The amount of the diolefin which can be present to form the improved preformed catalyst can be varied over a wide range, and of course, is somewhat dependent on the other catalyst concentrations.

The amount of diolefin used to preform the catalyst may be within the range of about 0.001 to 3 percent of the total amount of monomer to be polymerized. Expressed as a mole ratio of conjugated diolefin to nickel complex, the amount of diolefin present during the preforming step can be within the range of about 1 to about 3000 times the concentration of nickel. The preferred mole ratio of conjugated diolefin to nickel is about 5:1 to 500:1. It is most preferred to use about 50:1 to about 100:1.

This three-component catalyst system has polymerization activity over a wide range of catalyst concentration and catalyst ratios. The three catalyst components interreact to form the active catalyst. As a result, the optimum concentration for any one catalyst is very dependent upon the concentrations of each of the other two catalyst components. Furthermore, while polymerization will occur over a wide range of catalyst concentrations and ratios, polymers having the most desirable properties are obtained over a narrower range. Polymerization can occur while the mole ratio of the organoaluminum compound (Me) to the organonickel compound (Ni) ranges from about 0.3/1 to about 300/1; the mole ratio of hydrogen fluoride complex (HFC) to the organonickel compound (Ni) ranges from about 2/1 to about 300/1 and the mole ratio of hydrogen fluoride complex to the organoaluminum compound ranges from about 0.2/1 to about 15/1. However, the preferred mole ratios of Me/Ni ranges from about 2/1 to about 80/1, the preferred mole ratio of HFC/Ni ranges from about 5/1 to about 100/1 and the preferred mole ratio of HFC/Me ranges from about 0.4/1 to about 7/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in an inert solvent, and are, thus, solution polymerizations. By the term "inert solvent" is meant that the solvent or diluent does not enter into the structure of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as $-10°$ C. or below up to high temperatures such as 100° C. or higher. However, it is usually more desirable to employ a more convenient temperature between about 30° C. and about 90° C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30° C.

EXAMPLE I

A purified butadiene in benzene solution containing 10 grams of butadiene per hundred milliliters of solution was charged to a number of 4-ounce bottles. Nitrogen blanketed the premix while the catalysts were charged "in situ". The catalysts added were (a) triethylaluminum (TEAL) added as a 0.25 molar (M) solution in benzene, (b) 0.05 M nickel octanoate (Ni Oct) in benzene, and (c) 0.50 M hydrogen fluoride diethylether complex ($HF \cdot Et_2O$) in benzene. The bottles were capped tightly, placed in a water bath maintained at 50° C. and then tumbled end-over-end for the periods of time shown in Table 1. The polymerizations were terminated by mixing the polymer cements with one part of both triisopropanolamine and dibutyl-paracresol per hundred parts of original monomer used. The resulting polybutadiene polymers were dried under vacuum.

The amount of TEAL and of NiOct charged to each bottle was 0.1 and 0.0075 millimole; the amount of $HF \cdot Et_2O$ was varied as shown in Table 1. Polymer yields and dilute solution viscosities (DSV) obtained on the polybutadienes also are presented in Table 1:

Table 1

| Exp. No. | Millimole per 10 gm. BD,[1] HF . Et$_2$O | Pzn.[2] Time, Hours | Yield, Wt. % | DSV dl/gm |
|---|---|---|---|---|
| 1 | 0.08 | 18 | 2 | ND[3] |
| 2 | 0.13 | 1 | 31 | ND |
| 3 | 0.16 | 1 | 56 | 5.4 |
| 4 | 0.25 | 1 | 81 | 4.6 |
| 5 | 0.30 | 1 | 62 | 3.0 |
| 6 | 0.30 | 18 | 96 | ND |
| 7 | 0.40 | 18 | 83 | 2.0 |
| 8 | 0.60 | 18 | 20 | ND |
| 9 | 1.00 | 18 | 6 | ND |

[1]BD = butadiene.
[2]Pzn. = polymerization.
[3]ND = not determined.

EXAMPLE II

The procedure is the same as that in Example I except that triisobutylaluminum (TIBAL) was used rather than TEAL.

Table 2

| Exp. No. | Millimole per 10 gm. BD HF . Et$_2$O | Pzn. Time Hours | Yield, WT. % | DSV dl/gm |
|---|---|---|---|---|
| 1 | 0.08 | 19 | 10 | ND |
| 2 | 0.13 | 19 | 80 | 5.5 |
| 3 | 0.16 | 1 | 80 | 4.8 |
| 4 | 0.25 | 1 | 88 | 5.0 |
| 5 | 0.35 | 1 | 62 | 2.8 |
| 6 | 0.45 | 19 | 86 | 2.0 |
| 7 | 0.60 | 19 | 43 | 1.4 |
| 8 | 1.00 | 19 | 7 | ND |

EXAMPLE III

The procedure used is the same as Example I except that the polymerization solvent was heptane instead of benzene and the source of Ni is varied as shown in Table 3.

Table 3

| Exp. No. | Ni Compound | Millimole per 10 gm. BD HF . Et$_2$O | Pzn. Time Hours | Yield, Wt. % |
|---|---|---|---|---|
| 1 | NiNaph$_2$[1] | 0.25 | 0.75 | 67 |
| 2 | NiOct[2] | 0.25 | 0.75 | 65 |
| 3 | NiAcAc[3] | 0.25 | 1.00 | 65 |
| 4 | Ni(CO)$_4$ | 0.25 | 1.00 | 70 |
| 5 | NiAcAc | 0.15 | 1.00 | 68 |
| 6 | Ni(CO)$_4$ | 0.15 | 2.00 | 33 |

[1] = Nickel Naphthenate
[2] = Nickel Octanoate
[3] = Nickel Acetylacetonate
[4] = Nickel Tetracarbonyl

EXAMPLE IV

The procedure used is the same as that used in Example I except that different complexes of HF are compared as shown in Table 4.

Table 4

| Exp. No. | Millimole per 10 gm. BD HF . Complex | Pzn. Time Hours | Yield Wt. % | DSV dl/gm |
|---|---|---|---|---|
| 1 | 0.25 HF . Et$_2$O | 1 | 80 | 4.7 |
| 2 | 0.30 HF . Et$_2$O | 2 | 77 | 4.0 |
| 3 | 0.25 HF . Bu$_2$O[1] | 1 | 60 | 4.7 |
| 4 | 0.30 HF . Bu$_2$O[1] | 1 | 55 | 4.3 |
| 5 | 0.30 HF . THF | 2 | 52 | 5.2 |
| 6 | 0 30 HF . BN | 2 | 45 | 4.8 |
| 7 | 0.30 HF . Pyr. | 18 | 0 | — |
| 8 | 0.30 HF . Acetone[2] | 4 | 76 | 4.1 |

[1] - 0.075 millimole TEAL and 0.005 NiOct
[2] - 0.005 millimole NiOct
Et$_2$O - diethyl ether
Bu$_2$O - dibutyl ether
THF - tetrahydrofuran
BN - benzonitrile
Pyr - pyridine

EXAMPLE V

The procedure is the same as that used in Example I except the catalyst concentrations were varied. Polymerization time was four hours for all the experiments.

Table 5

| Exp. No. | Millimole/10 gm. BD | | | Yield, Wt. % | DSV dl/gm |
|---|---|---|---|---|---|
| | TEAL | NiOct | HF . Et$_2$O | | |
| 1 | 0.07 | 0.005 | 0.25 | 63 | 2.6 |
| 2 | 0.10 | 0.005 | 0.30 | 80 | 2.9 |
| 3 | 0.15 | 0.0075 | 0.45 | 86 | 2.8 |

EXAMPLE VI

The procedure is the same as that used in Example I; however, triisobutylaluminum (TIBAL), 0.10 millimole, is used instead of triethylaluminum (TEAL) and various hydrogen fluoride alcoholates and water are used.

Table 6

| Exp. No. | Millimole per 10 gm. BD HF . Alcoholate | Pzn. Time, Hours | Yield, Wt. % | DSV dl/gm |
|---|---|---|---|---|
| 1 | 0.4 Methanol | 19.0 | 10.8 | — |
| 2 | 0.8 Methanol | 19.0 | 4.4 | — |
| 3 | 0.4 Ethanol | 19.0 | 11.8 | — |
| 4 | 0.8 Ethanol | 19.0 | 5.3 | — |
| 5 | 0.4 Propanol | 19.0 | 49.4 | 8.31 |
| 6 | 0.8 Propanol | 19.0 | 4.7 | — |
| 7 | 0.4 Isopropanol | 2.5 | 25.6 | 6.56 |
| 8 | 0.8 Isopropanol | 19.0 | 9.5 | — |
| 9 | 0.4 Cyclohexanol | 2.5 | 32.9 | 6.87 |
| 10 | 0.8 Cyclohexanol | 19.0 | 15.4 | — |
| 11 | 0.4 Phenol | 2.5 | 68.4 | 5.23 |
| 12 | 0.8 Phenol | 19.0 | 70.4 | 2.66 |
| 13 | 0.4 Water | 19.0 | 70.0 | |

EXAMPLE VII

The procedure used is similar to that in Example I except that the catalyst is preformed in the presence of a small amount of the monomer, butadiene. If the organometallic compound, Ni compound and HF complex are mixed together before charging to the premix, the resulting gray slurry has almost no polymerizing catalytic activity. However, if even a small amount of butadiene or other conjugated diolefin is present, the preformed catalyst is quite active. Butadiene must be present before the organometallic has an opportunity to react either with the Ni compound or the HF.

In this example the standard order of addition for mixing the catalyst components was:
1. Solvent
2. Butadiene
3. Organometallic
4. Ni compound
5. HF complex Table 7

| Exp. No. | BD:Ni* mole ratio | Polymer Yield % at 4 Hrs. | DSV dl/gm | Mn Osmotic |
|---|---|---|---|---|
| 1 | 0 | 1 | — | — |
| 2 | 40 | 56 | 3.3 | ND |
| 3 | 100 | 71 | 3.3 | 137,000 |
| 4 | 300 | 73 | 3.2 | ND |

*The amount of BD in the preformed catalysts varied and was 0, 3, 7.5 and 22.5 millimoles per 100 gm. of BD.

EXAMPLE VIII

The procedure used is the same as that used in Example VII except that the preforming conjugated diolefin is myrcene (7-methyl, 3-methylene, 1,6-octadiene) an isoprene dimer.

Table 8

| Exp. No. | Millimole per 10 gm. BD | | | | Pzn.Time Hours | Yield Wt. % | DSV dl/gm |
|---|---|---|---|---|---|---|---|
| | Myrcene | HF . Ether | TIBAL | NiNaph | | | |
| 1 | .075 | .25 | .10 | .0075 | 4 | 27 | — |
| 2 | .375 | .25 | .10 | .0075 | 2 | 65 | 5.2 |

While certain representative embodiments and details have been shown for the purpose of illustrating this invention, it will be apparent to those skilled in the art that various changes and modifications may be made therein without departing from the spirit or scope of the invention.

What is claimed is:

1. A catalyst composition consisting essentially of (1) an organoaluminum compound of the formula

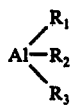

wherein $R_1$ is selected from the group consisting of alkyl, cycloalkyl, aryl, alkaryl, arylalkyl, alkoxy, hydrogen and fluorine, $R_2$ and $R_3$ being selected from the group consisting of alkyl, including cycloalkyl, aryl, alkaryl and arylalkyl, (2) organonickel compound selected from the class consisting of nickel salts of carboxylic acids, organic complex compounds of nickel, nickel tetracarbonyl and mixtures thereof and (3) at least one hydrogen fluoride complex (HFC) prepared by complexing hydrogen fluoride with a member of the class consisting of ketones of the formula

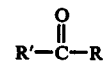

wherein R and R' represent alkyl, cycloalkyl, aryl, alkaryl or arylalkyl radicals containing from 1 to about 30 carbon atoms and R and R' may be the same or dissimilar, alcohols of the formula ROH where R represents alkyl, cycloalkyl, aryl, alkaryl or arylalkyl radicals containing from 1 to about 30 carbon atoms, nitriles represented by the formula RCN where R represents alkyl, cycloalkyl, aryl, alkaryl or arylalkyl radicals containing from 1 to about 30 carbon atoms, and water, in which the mole ratio of the organoaluminum compound to the organonickel compound ranges from about 0.3/1 to about 300/1, the mole ratio of the hydrogen fluoride complex to the organonickel compound ranges from about 2/1 to about 300/1, and the mole ratio of the hydrogen fluoride complex to the organoaluminum compound ranges from about 0.2/1 to about 15/1, said catalyst is preformed in the presence of a conjugated diolefin, said conjugated diolefin being present in a mole ratio of conjugated diolefin to organonickel compound from about 5/1 to about 500/1.

* * * * *